(12) United States Patent
Jung et al.

(10) Patent No.: US 10,588,007 B2
(45) Date of Patent: Mar. 10, 2020

(54) DEVICE-TO-DEVICE (D2D) OPERATION METHOD PERFORMED BY TERMINAL IN WIRELESS COMMUNICATIONS SYSTEM AND TERMINAL USING SAME

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/502,460

(22) PCT Filed: Aug. 10, 2015

(86) PCT No.: PCT/KR2015/008363
§ 371 (c)(1),
(2) Date: Feb. 7, 2017

(87) PCT Pub. No.: WO2016/022009
PCT Pub. Date: Feb. 11, 2016

(65) Prior Publication Data
US 2018/0199181 A1   Jul. 12, 2018

Related U.S. Application Data

(60) Provisional application No. 62/034,780, filed on Aug. 8, 2014.

(51) Int. Cl.
*H04W 8/00* (2009.01)
*H04W 72/02* (2009.01)
(Continued)

(52) U.S. Cl.
CPC .......... *H04W 8/005* (2013.01); *H04W 72/02* (2013.01); *H04W 72/0453* (2013.01);
(Continued)

(58) Field of Classification Search
CPC ..... H04W 8/005; H04W 76/14; H04W 72/02; H04W 72/042; H04W 72/0453; H04W 4/80; H04W 76/27
See application file for complete search history.

(56) References Cited

U.S. PATENT DOCUMENTS 9,615,356 B2 * 4/2017 Fujishiro ............... H04W 72/04
2006/0025136 A1 * 2/2006 Fujita ................. H04W 74/0816
455/436

(Continued)

FOREIGN PATENT DOCUMENTS

JP      2012-209893 A    10/2012
KR   1020070046845 A     5/2007
(Continued)

OTHER PUBLICATIONS

"Discussion on resource allocation for D2D discovery", ETRI, 3GPP TSG RAN WG1 Meeting #75, San Francisco, USA, Nov. 11-15, 2013, R1-135279.
(Continued)

*Primary Examiner* — Peter P Chau
(74) *Attorney, Agent, or Firm* — Dentons US LLP

(57) ABSTRACT

Provided are a device-to-device (D2D) operation method performed by a terminal in a wireless communications system and a terminal using the same. The method comprises: receiving, from a network, a frequency list indicating frequencies at which a D2D operation is allowed; and performing a D2D operation by selecting a specific frequency from among the frequencies in the frequency list.

1 Claim, 18 Drawing Sheets

(51) Int. Cl.
*H04W 76/14* (2018.01)
*H04W 72/04* (2009.01)
*H04W 48/12* (2009.01)
*H04W 4/80* (2018.01)
*H04W 76/27* (2018.01)

(52) U.S. Cl.
CPC .............. *H04W 76/14* (2018.02); *H04W 4/80* (2018.02); *H04W 48/12* (2013.01); *H04W 72/042* (2013.01); *H04W 76/27* (2018.02)

(56) References Cited

U.S. PATENT DOCUMENTS

| | | | |
|---|---|---|---|
| 2009/0149208 A1* | 6/2009 | Huttunen | H04W 24/10 455/509 |
| 2013/0178221 A1 | 7/2013 | Jung et al. | |
| 2013/0308551 A1 | 11/2013 | Madan et al. | |
| 2014/0206322 A1* | 7/2014 | Dimou | H04W 4/005 455/414.1 |
| 2014/0307657 A1* | 10/2014 | Baek | H04W 72/02 370/329 |
| 2015/0119022 A1* | 4/2015 | Saito | H04W 64/00 455/426.1 |
| 2015/0126210 A1* | 5/2015 | Peng | H04L 5/001 455/452.1 |
| 2015/0230141 A1* | 8/2015 | Zou | H04W 48/06 455/437 |
| 2016/0014590 A1* | 1/2016 | Agiwal | H04W 8/005 455/426.1 |
| 2016/0014837 A1* | 1/2016 | Seo | H04W 76/027 370/329 |
| 2016/0044539 A1* | 2/2016 | Yiu | H04W 36/26 370/235 |
| 2016/0044730 A1* | 2/2016 | Baghel | H04W 76/023 370/329 |
| 2016/0174142 A1* | 6/2016 | Kitagawa | H04W 76/14 455/418 |
| 2016/0174181 A1* | 6/2016 | Fujishiro | H04W 76/14 455/435.1 |
| 2016/0330728 A1* | 11/2016 | Sorrentino | H04W 72/048 |
| 2018/0063852 A1* | 3/2018 | Kang | H04W 72/10 |

FOREIGN PATENT DOCUMENTS

| | | |
|---|---|---|
| KR | 10-2008-0113837 A | 12/2008 |
| KR | 1020130088898 A | 8/2013 |
| WO | 2014/003358 A1 | 1/2014 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8)", 3GPP TS 36.304 V8.5.0 (Mar. 2009).
"D2D capability for multi-carrier capable UE," 3GPP TSG-RAN WG2 #86, May 19-23, 2014, R2-142634.
Kyocera, "Inter-frequency discovery considerations", 3GPP TSG-RAN WG2 #86, May 19-23, 2014, R2-142240.
Intel Corporation, "Discussion on D2D Multicarrier Capabilities", 3GPP TSG RAN WG1 Meeting #77, May 19-23, 2014, R1-142316.

* cited by examiner

DEVICE-TO-DEVICE (D2D) OPERATION METHOD PERFORMED BY TERMINAL IN WIRELESS COMMUNICATIONS SYSTEM AND TERMINAL USING SAME

CROSS-REFERENCE TO RELATED APPLICATIONS

This application is the National Stage filing under 35 U.S.C. 371 of International Application No. PCT/KR2015/008363, filed on Aug. 10, 2015, which claims the benefit of U.S. Provisional Application No. 62/034,780 filed on Aug. 8, 2014, the contents of which are all hereby incorporated by reference herein in their entirety.

BACKGROUND OF THE INVENTION

Field of the Invention

The present invention relates to wireless communications, and, more specifically, to a device-to-device (D2D) operation method performed by a terminal in a wireless communications system and a terminal using the same.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, an UE may perform a D2D operation only at the current serving frequency according to its capability or may perform the D2D operation even at a frequency other than the serving frequency. When the UE is able to perform a D2D operation at a plurality of frequencies, the network may configure a plurality of frequencies at which a D2D operation is allowed/supported for the UE. At this point, according to a frequency at which the UE selects from among a plurality of frequencies at which the D2D operation is allowed, UE capability for a normal operation, other than the D2D operation, may be changed.

For example, a UE may support a combination of frequencies {F1, F2} for carrier aggregation (CA), and support a D2D operation at F3. In addition, the UE may support a combination of frequencies {F1, F3} for CA and support a D2D operation at F3. Suppose that the network supports a D2D operation by providing D2D operation configuration at all of F1, F2, and F3, and thus informs the UE of the D2D operation configuration.

If a combination of frequencies {F2, F3} for CA is set for the UE when the UE selects F3 for a D2D operation, the UE is not able to support the CA and the D2D operation at the same time.

SUMMARY OF THE INVENTION

An object of the present invention is to provide a device-to-device (D2D) operation method performed by a UE in a wireless communications system and a UE using the same.

In an aspect, a method for device-to-device (D2D) operation in a wireless communication system is provided. The method is performed by a User Equipment (UE) and comprises receiving, from a network, a frequency list indicating frequencies at which a D2D operation is allowed and performing the D2D operation by selecting a specific frequency from among frequencies included in the frequency list.

The method may further comprise transmitting frequency information indicating the specific frequency to the network.

Information indicating a selection criteria used for selecting the specific frequency from the frequencies included in the frequency list may be further received.

The information indicating the selection criteria may indicate either random selection of the specific frequency from among the frequencies included in the frequency list or selection of the specific frequency list by the UE without any limitation.

Selecting a specific frequency from among the frequencies included in the frequency list may be performed at an interval.

Selecting a specific frequency from among the frequencies included in the frequency list may be performed at least once in a predetermined period of time.

The D2D operation performed at the specific frequency may be D2D communication or D2D discovery.

In another aspect, a User Equipment (UE) is provided. The UE comprises a Radio Frequency (RF) unit that transmits and receives a wireless signal and a processor configured to operate in conjunction with the RF unit, wherein the processor that: receives, from a network, a frequency list indicating frequencies at which a D2D operation is allowed, and performs the D2D operation by selecting a specific frequency from among frequencies included in the frequency list.

According to the present invention, a network may be aware of exact frequencies at which a UE actually performs D2D operation from among a plurality of frequencies which allow/support a D2D operation. Accordingly, it is possible to prevent the D2D operation of the UE from being stopped and to reduce intervention to other ordinary wide area network (WAN) communications.

DESCRIPTION OF EXEMPLARY EMBODIMENTS

Figure 1:
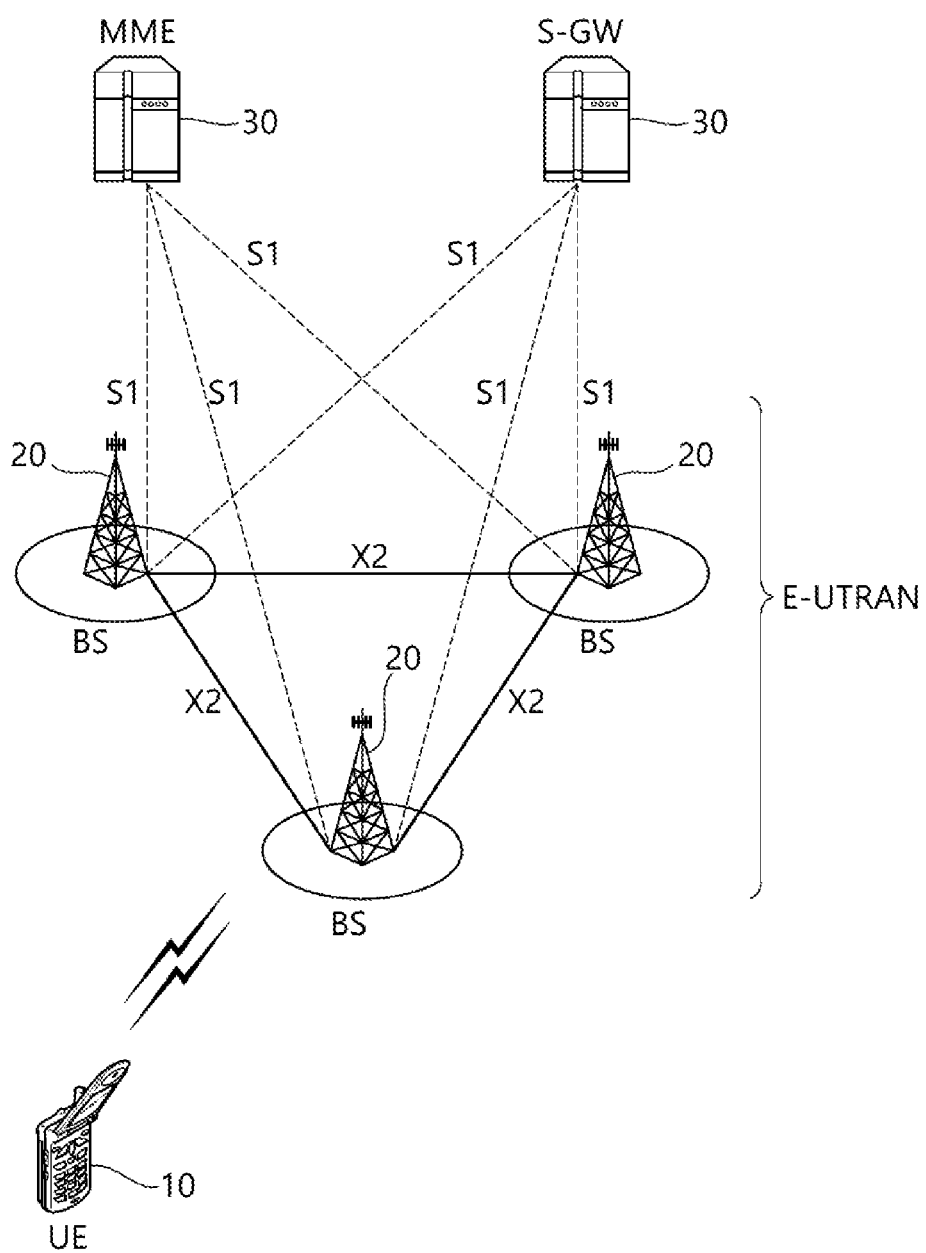
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
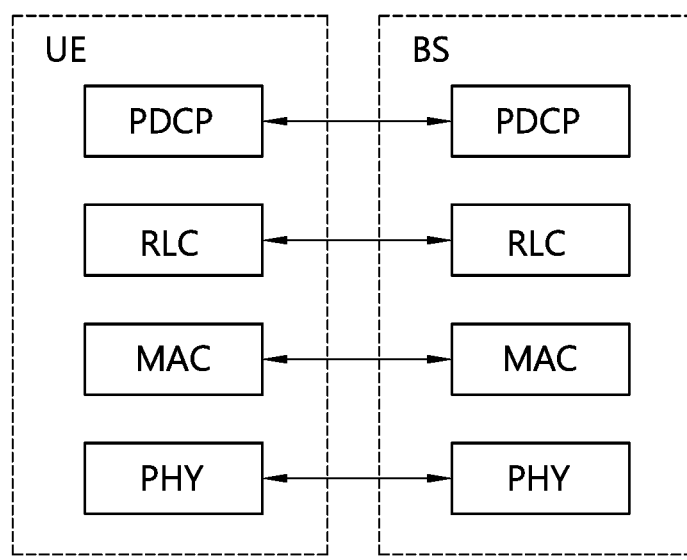
FIG. 2 is a diagram showing a wireless protocol architecture for a user plane.
Figure 3:
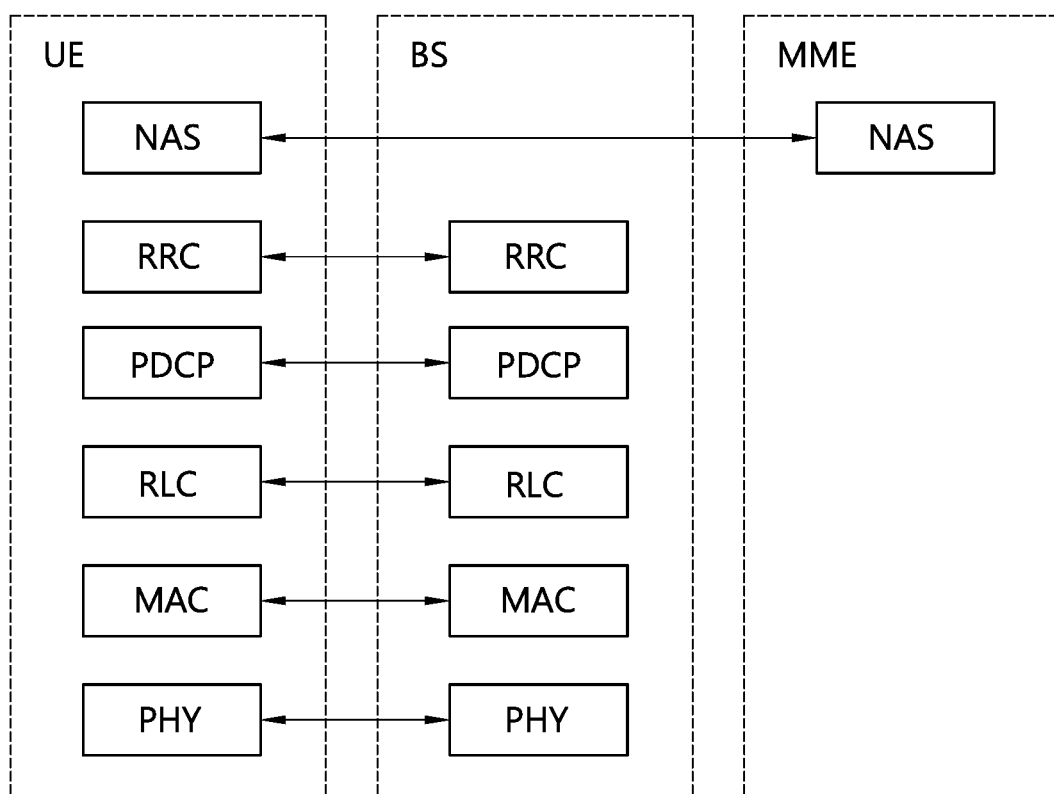
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g.

cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIB s.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIBS. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
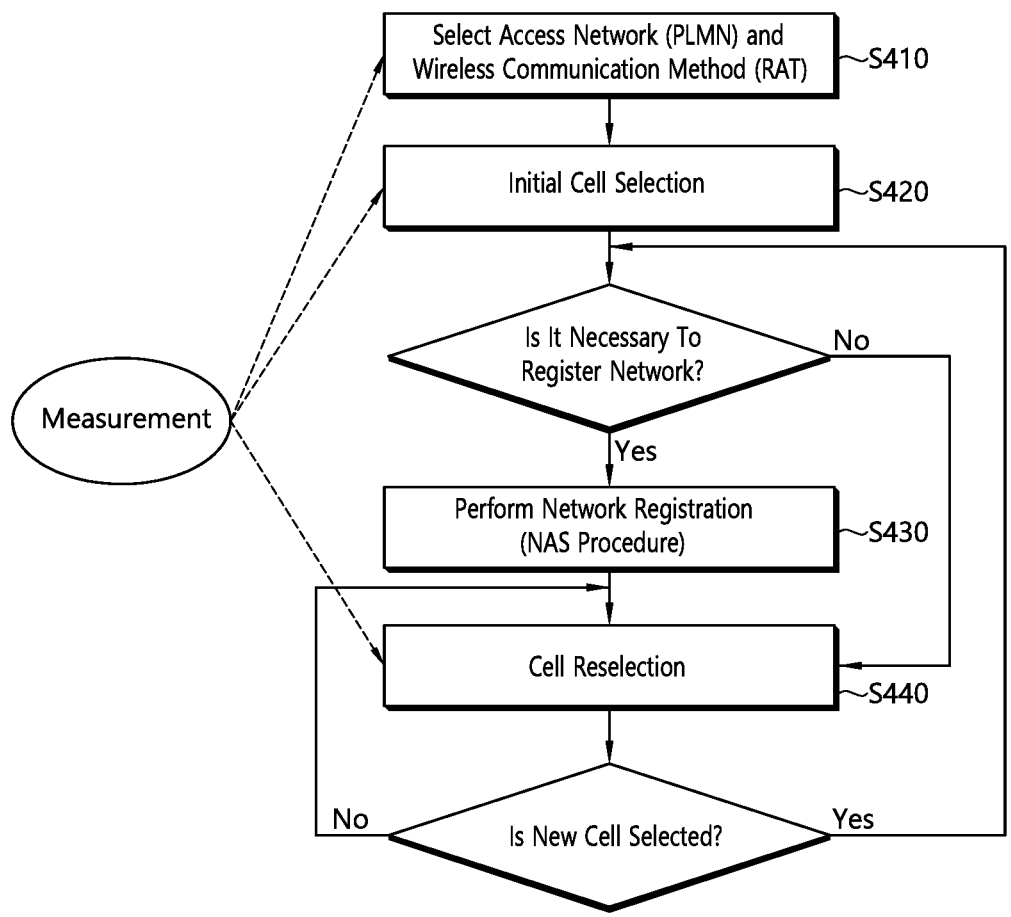
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
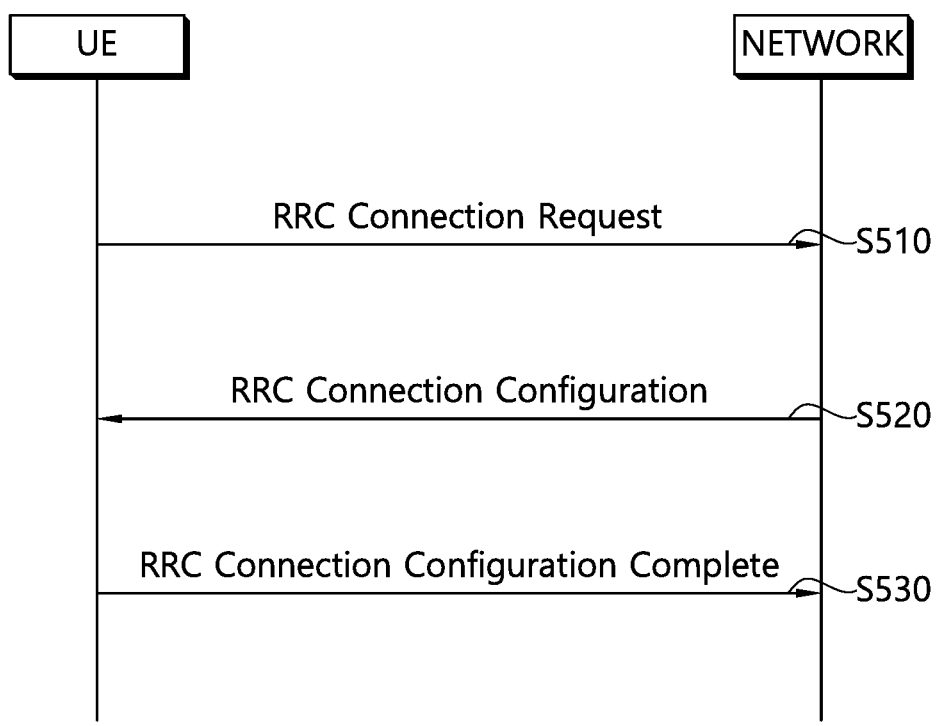
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
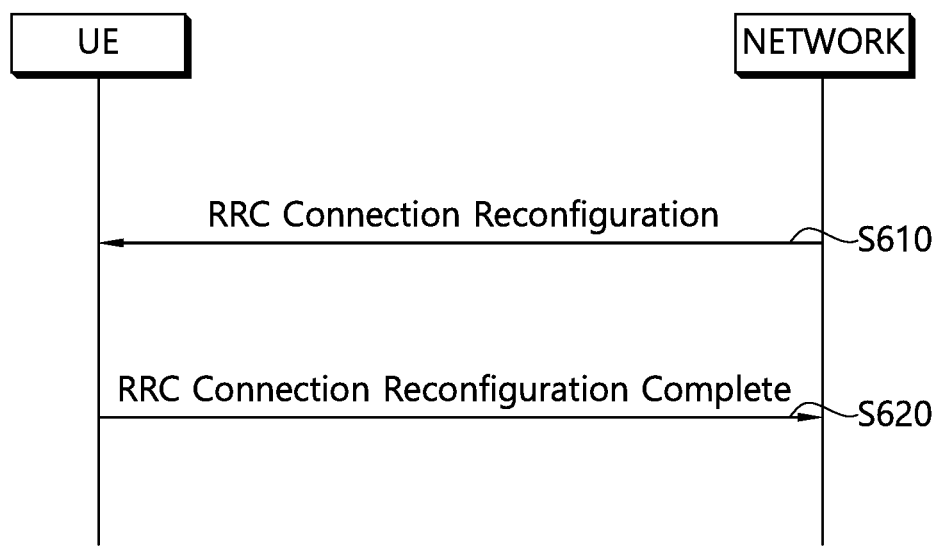
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

Srxlev>0 AND squal>0,   [Equation 1]

wherein:

Srxlev=$Q_{rxlevmeas}-(Q_{rxlevmin}+Q_{rxlevminoffset})-P_{compensation}$,

Squal=$Q_{qualmeas}-(Q_{qualmin}+Q_{qualminoffset})$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$  [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not receive Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
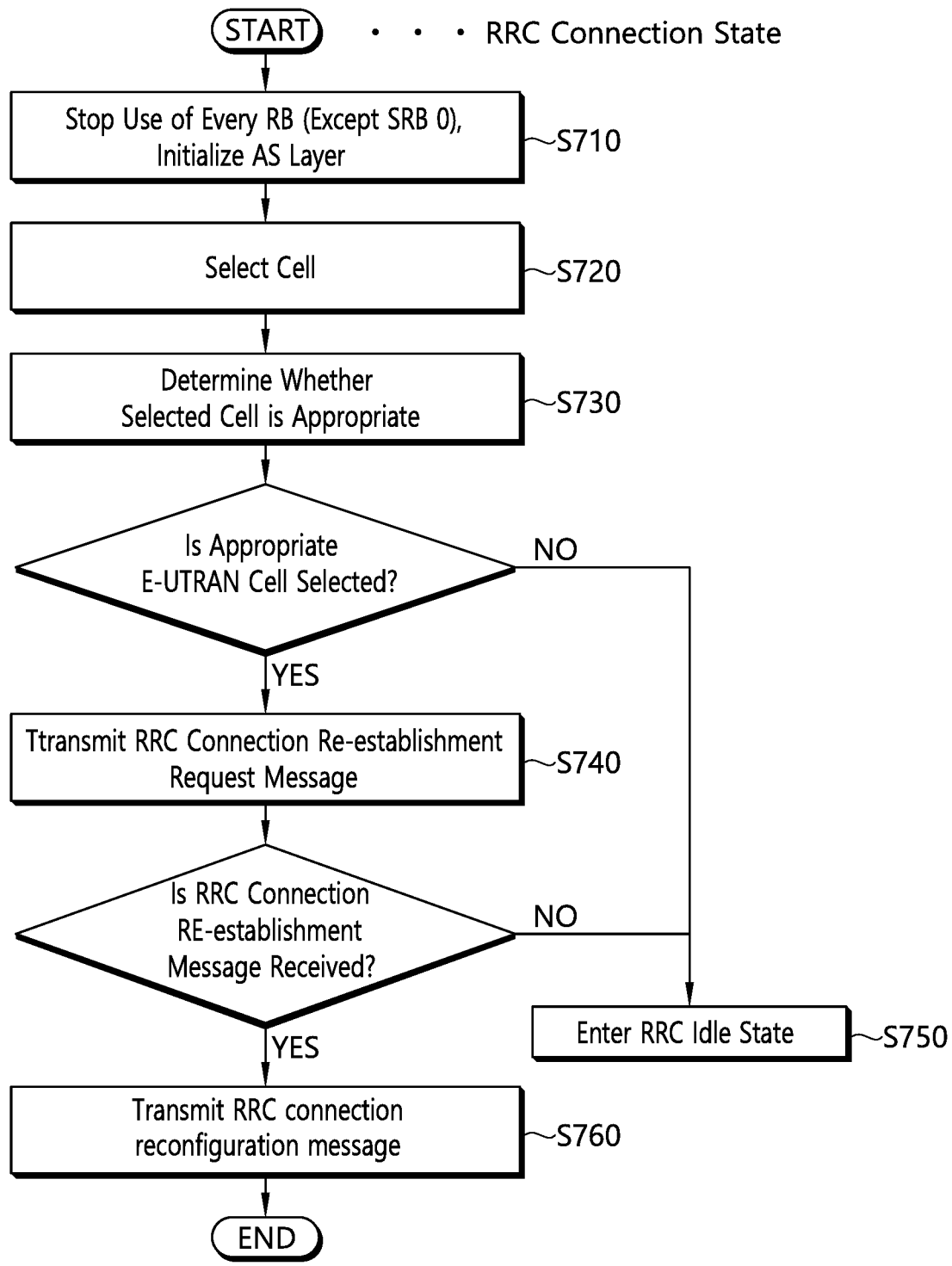
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
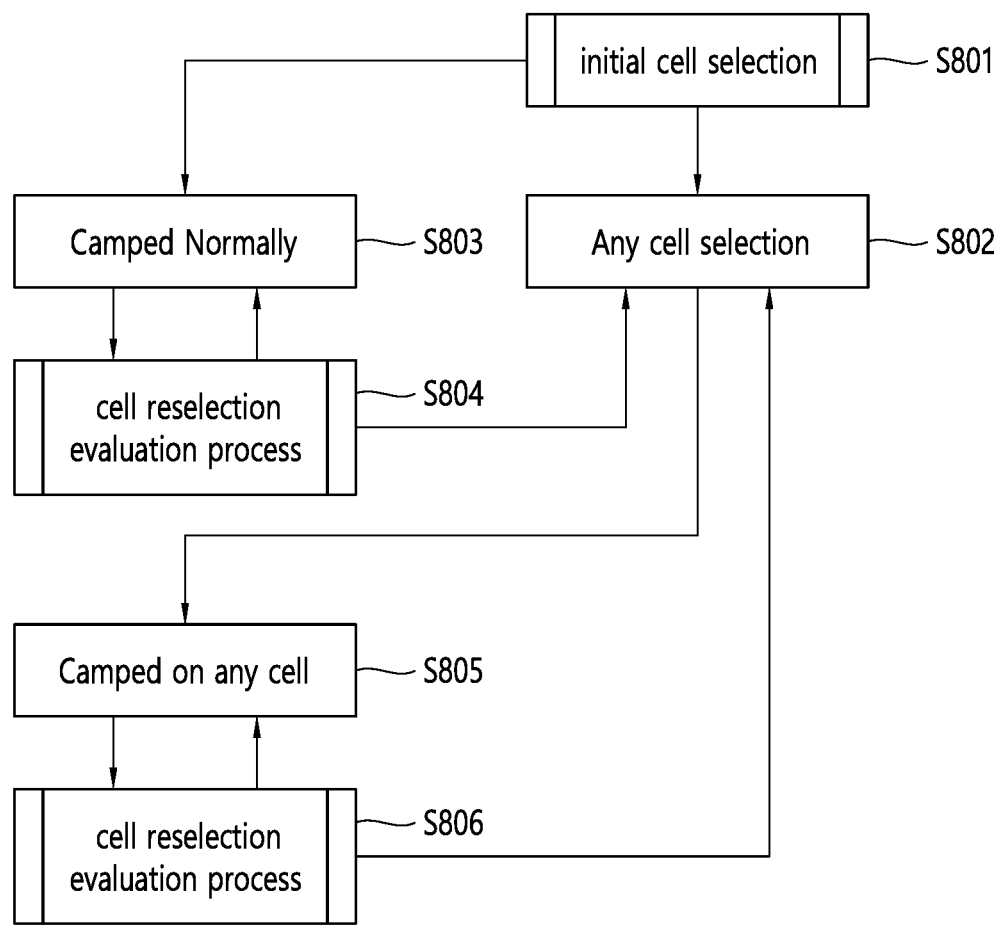
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
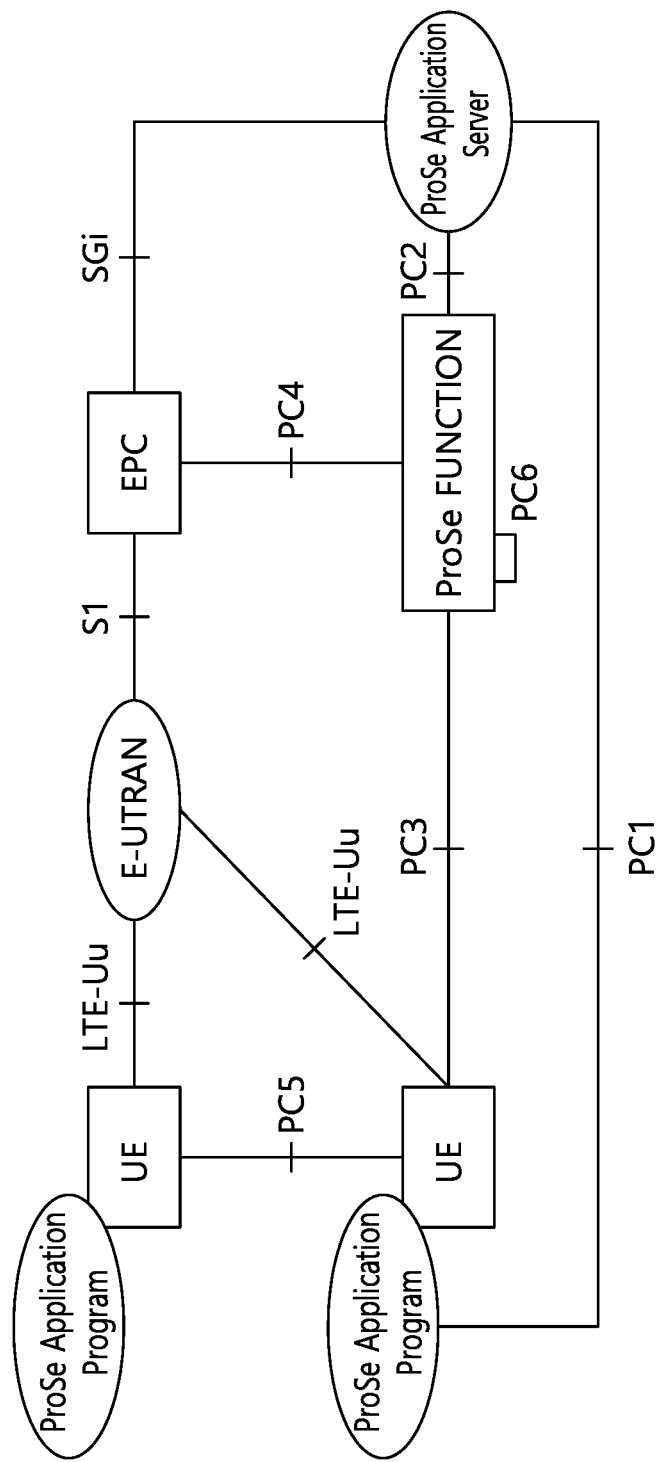
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
 Interworking via a reference point towards the 3rd party applications
 Authorization and configuration of the UE for discovery and direct communication)
 Enable the function of the EPC level ProSe discovery
 ProSe related new subscriber data and handling of data storage, and also handling of ProSe identities
 Security related function
 Provide control towards the EPC for policy related function
 Provide function for charging (via or outside of EPC, e.g., offline charging))

Hereinafter, a reference point and a reference interface will be described in a reference structure for the ProSe.
 PC1: a reference point between a ProSe application program in the terminal and a ProSe application program in a ProSe application server. The PC1 is used to define signaling requirements in an application level.
 PC2: is a reference point between the ProSe application server and a ProSe function. The PC2 is used to define an interaction between the ProSe application server and a ProSe function. An application data update of a ProSe database of the ProSe function may be an example of the interaction.
 PC3: is a reference point between the terminal and the ProSe function. The PC3 is used to define an interaction between the terminal and the ProSe function. Configuration for ProSe discovery and communication may be an example of the interaction.
 PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
 PC5: is a reference point to use control/user plane for discovery, communication, and relay between terminals, and 1:1 communication.
 PC6: is a reference point to use a function such as ProSe discovery between users included in different PLMNs.
 SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
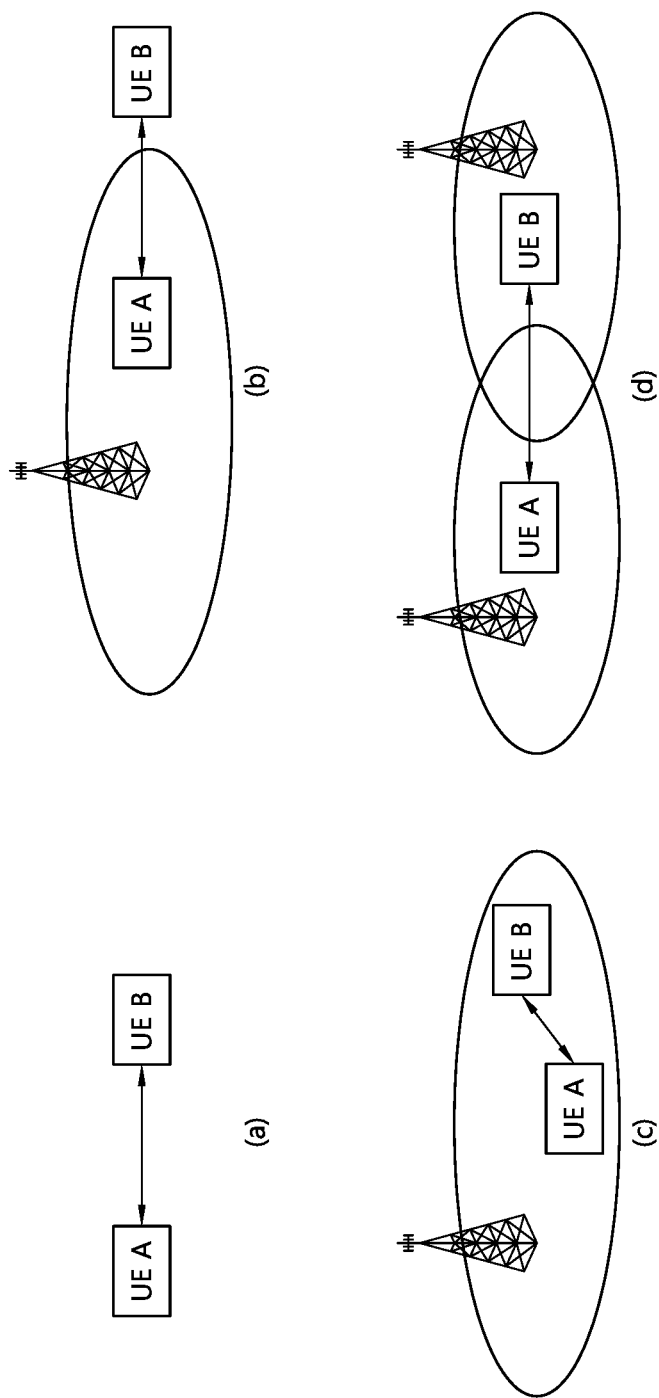
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
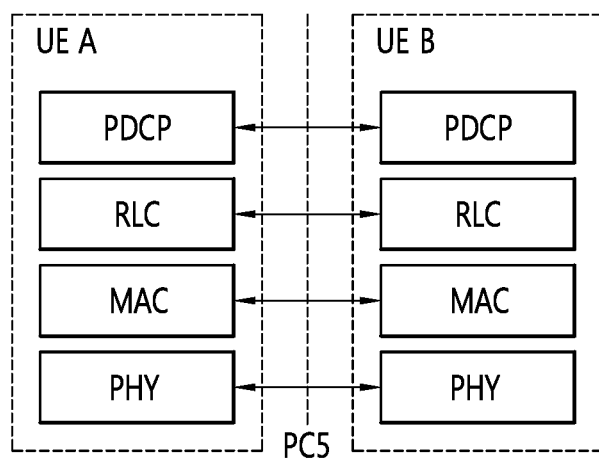
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
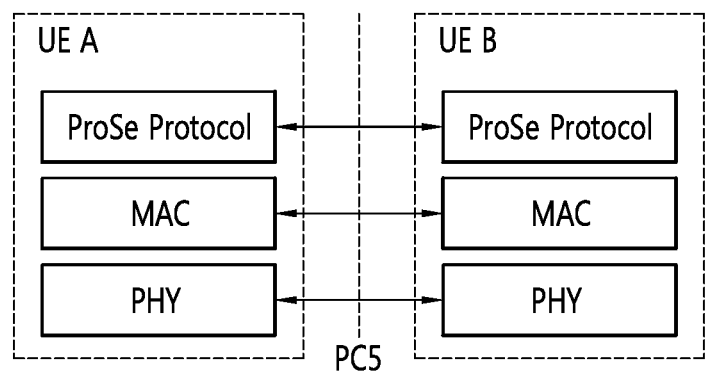
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 13:
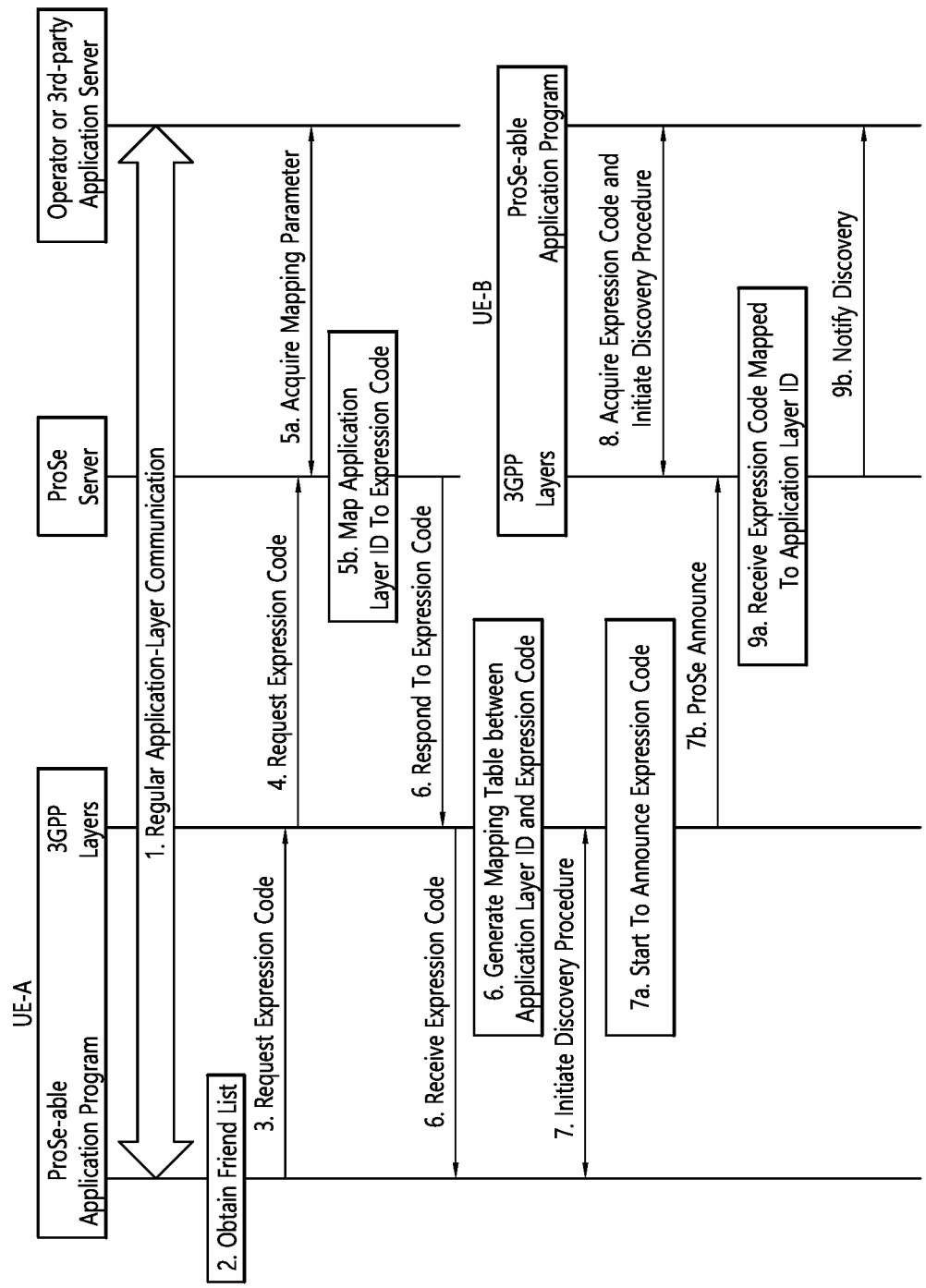
FIG. 13 illustrates an embodiment of a ProSe direct discovery procedure.

FIG. 13 illustrates an embodiment of a ProSe direct discovery procedure.

Referring to FIG. 13, it is assumed in a terminal A and a terminal B that a ProSe-enabled application program is operated, and the terminal A and the terminal B are configured in a friend relationship to each other, that is, a relationship capable of allowing D2D communication with each other in the application program. Hereinafter, the terminal B may be expressed as a friend of the terminal A. For example, the application program may be a social networking program. 3GPP Layers correspond to functions of an application program for using a ProSe discovery service regulated according to 3GPP.

A ProSe direct discovery between the terminal A and the terminal B may perform a following procedure.

1. First, the terminal A performs regular application-Layer communication with an application server. The above communication is performed based on Application programming interface (API).

2. A ProSe enabled application program of the terminal A receives a list of application layer IDs having a friend relationship. The application layer ID may generally be in the form of a network access ID. For example, an application layer ID of the terminal A may have a form such as adam@example.com.

3. A terminal A requests private expression codes for a user and private expression codes for a friend of the user.

4. 3GPP layers transmit an expression code request to a ProSe server.

5. The ProSe server map application layer IDs provided from an operator or a third application server to private expression codes. For example, an application layer ID such as adam@example.com. The mapping may be performed based on parameters (e.g., mapping algorithms, key values, and the like) received from an application service of the network.

6. The ProSe server responds the obtained expression codes to the 3GPP layers. The 3GPP layers report that expression codes with respect to the requested application layer are successively received to the ProSe enabled application program. Further, a mapping table between the application layer IDs and the expression codes are generated.

7. The ProSe enabled application program requests the 3GPP layers to start the discovery procedure. That is, when one of friends is located close to the terminal A and direct communication may be performed, the ProSe enabled application program attempts the discovery. 3GPP layers announce a private expression code of the terminal A (that is, "GTER543$#2FSJ67DFSF" which is a private expression code of adam@example.com in the above example). In mapping of an application layer ID of a corresponding application program and the private expression code, the mapping relationship may be known by the previously received friends, and the mapping may be performed.

8. It is assumed that the terminal B is operating the same ProSe enabled application program as that of the terminal A, and the above steps 3 to 6 may be executed. 3GPP layers included in the terminal B may perform ProSe discovery.

9. When the terminal B receives the above announce from the terminal A, the terminal B determines whether the private expression code included in the announce is known by the terminal B or is mapped to an application layer ID. As illustrated in step 8, since the terminal B performs steps 3 to 6, the terminal B knows a private expression code with respect to the terminal A, mapping of the private expression code to the application layer ID, and which is a corresponding application program. Accordingly, the terminal B may discover the terminal B from the announce of the terminal A. The 3GPP layers in the terminal B announces that adam@example.com is discovered to the ProSe enable application program.

FIG. 13 illustrates a discovery procedure by taking into consideration the terminals A and B, the ProSe server, and the application server. Only an operation side between the terminals A and B is described. The terminal A transmits a signal called the announce (the procedure may refer to announcement), and the terminal B receives the announce to discover the terminal A. That is, a discovery procedure of FIG. 13 in an operation directly related to another terminal among operations performed by each terminal may refer to a single step discovery procedure may refer to a single step discovery procedure in a side of one step.

Figure 14:
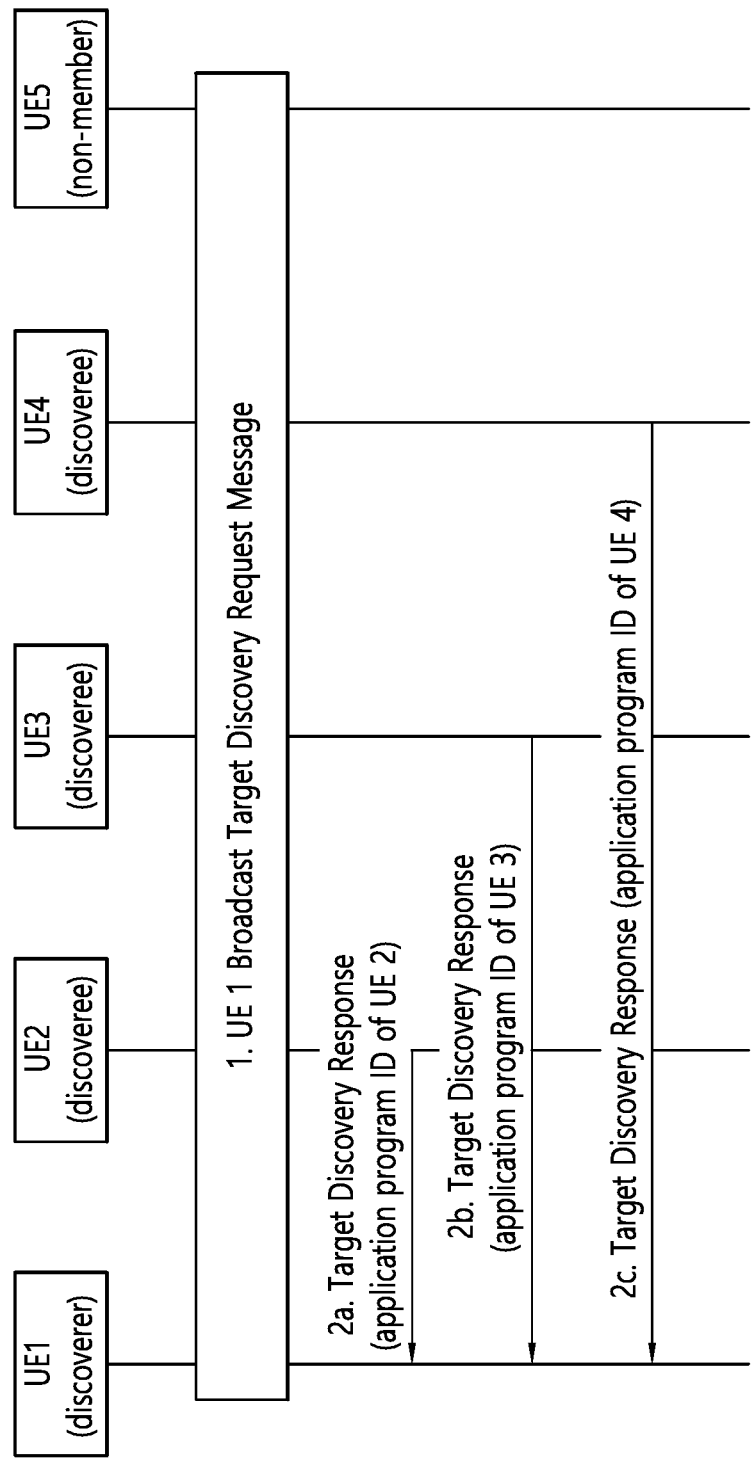
FIG. 14 illustrates another embodiment of a ProSe direct discovery procedure.

FIG. 14 illustrates another embodiment of a ProSe direct discovery procedure.

In FIG. 14, it is assumed that the terminal 1 to the terminal 4 may be included in a specific group communication system enablers (GCSE) group. It is assumed that the terminal 1 is a discoverer and terminals 2, 3, and 4 are a discoveree. A terminal 5 is a terminal regardless of a discovery procedure.

The terminal 1 and the terminals 2 to 4 may perform a following operation in a discovery procedure.

First, the terminal 1 broadcasts a targeted discovery request message (hereinafter referred to 'discovery request message' or 'M1') in order to discover whether an optional terminal included in the GCSE group is located around the terminal 1. The targeted discovery request message may include a unique application program group ID or a layer-2 group ID of the specific GCSE group. Further, the targeted discovery request message may include a unique ID of the terminal 1, that is, an application program private ID. The targeted discovery request message may be received by the terminals.

The terminal 5 transmits no response messages. The terminals 2, 3, and 4 included in the GCSE group transmit a targeted discovery response message (hereinafter referred to as a discovery response message or M2) as a response to the targeted discovery request message. The targeted discovery response message may include a unique application program private ID of a terminal transmitting the message.

An operation of terminals in a ProSe discovery procedure illustrated in FIG. 14 will be described. A discoverer (UE 1) transmits the targeted discovery request message, and receives a targeted discovery response message being a response thereto. In addition, if a discoveree (e.g., UE 2) receives the targeted discovery request message, the discoveree transmits a targeted discovery response message as a response thereto. Accordingly, each terminal performs an operation a second step. In the above side, a ProSe discovery procedure of FIG. 14 may refer to a discovery procedure.

In addition to the discovery procedure illustrated in FIG. 14, if the terminal 1 (discoverer) transmits a discovery confirm message (hereinafter may refer to M3) as a response to the targeted discovery response message, this may refer to a third step discovery procedure.

Hereinafter, descriptions about the present invention will be provided.

A UE may support a D2D operation at a plurality of carriers. For example, if carriers #1-5 are set for the UE, the UE may support the D2D operation at all of the sub carrier #1-5 or only at carriers #1 and #3.

A network may set a plurality of frequencies at which the UE is allowed to perform a D2D operation, and the UE may perform the D2D operation at all or some of the set frequencies. According to a frequency at which the UE performs the D2D operation, normal operations at other frequencies, that is, the UE capability with respect to a wide area network (WAN), may be changed.

For example, the UE may support a combination of frequencies {F1, F2} for carrier aggregation, and may support a D2D operation at F3. In addition, the UE may support a combination of frequencies {F1, F3} for carrier aggregation, and may support a D2D operation at F3. Suppose that the network supports the D2D operation by providing D2D operation-related configuration at all of the F1, F2, and F3, and informs the UE of the above configuration.

If the network sets a frequency combination {F2, F3} to the UE for carrier aggregation when the UE selects F3 for a D2D operation, the UE may not support the carrier aggregation and the D2D operation together.

Thus, it is important for the network to know which frequency at which the UE actually performs the D2D operation among a plurality of frequencies, at which D2D operation is allowed or supported. Only then may the network not just appropriately configure a normal WAN operation, but prevent the D2D operation from being stopped so that reliability of the D2D operation may be achieved.

Meanwhile, Prose direct communication (D2D communications) standard technology of 3GPP Rel-12 has been introduced for public safety (PS) communications, and may be used in vehicle-to-vehicle (V2V) service for public safety. The V2V service is an example of a vehicle to everything (V2X) service which is a service by which a vehicle communicates with other person/thing in order to maximize public safety and/or provide convenience services. A call for V2X urgent safety service may be regarded as a PS call, which may be referred to as a V2X PS call. Even a V2X service not requiring urgent communications may be regarded as a non-PS call, which may be referred to as V2X non-Ps call. When a UE further provides a network with information indicating that a corresponding call is a PS call, the information may include a 1-bit indicator that indicates that the corresponding call is a PS call. Alternatively, a specific purpose of a PS call, for example, an indicator showing a purpose of a V2X PS service may be included in a procedure of establishing RRC connection, for example, a message of complete establishment of RRC connection.

That is, the present invention may be applied to a D2D operation, and, specifically, to communications for public safety and V2X communication, especially, V2V communications.

Figure 15:
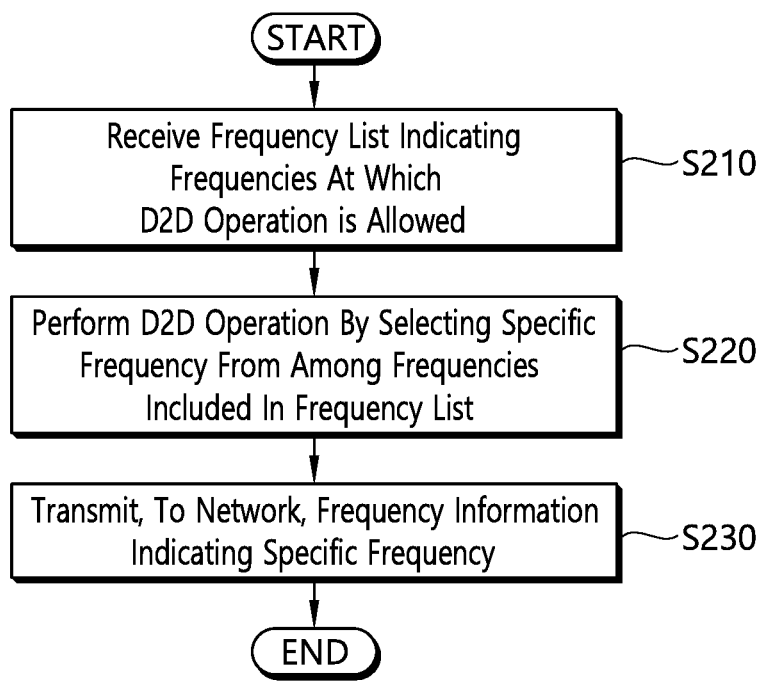
FIG. 15 is a D2D operation method performed by a UE according to an embodiment of the present invention.

FIG. 15 is a D2D operation method performed by a UE according to an embodiment of the present invention.

Referring to FIG. 15, a UE receives, from a network, a frequency list indicating frequencies at which D2D operation is allowed in S210.

That is, the network transmits, to the UE, a frequency list indicating at least one frequency. Each frequency included in a frequency list is a frequency at which a D2D operation is allowed or supported. When transmitting a frequency list, the network may also provide D2D configuration for each frequency included in the frequency list.

The D2D configuration may include information about resources (a resource pool) which are able to be used for a D2D operation. The D2D operation may be transmission or reception of a D2D signal when it comes to transmission or reception of signal, or may be D2D communication (ProSe direct communication) or D2D discovery (ProSe direction discovery) when it comes to context of a signal.

The UE selects a specific frequency from among frequencies included in the frequency list, and performs a D2D operation in S220.

The UE transmits, to the network, frequency information indicating the specific frequency. That is, the UE feeds back, to the network, frequency information that indicates a frequency selected for performing a D2D operation.

Meanwhile, when providing the frequency list, the network may provide selection criteria information together. The selection criteria information may be information about a selection criteria or selection method used when the UE selects the specific frequency from among frequencies included in the frequency list.

The selection criteria information may indicate any one of the following selection criterion.

1. Random Selection

If selection criteria information indicates the random selection, a UE may perform a D2D operation by selecting a random frequency with an equal probability from among frequencies included in a frequency list. The frequency is randomly selected with an equal probability, and thus, the greater the number of selections, the more equal the number of times each frequency will be selected. If frequencies available for the UE is limited to only some of frequencies include in the frequency list due to UE's capability, the UE may select a frequency with an equal probability from among available frequencies and may adjust a frequency selection probability such that the sum of all probabilities of selecting all the frequencies equals 1.

The method of random selection may be applied even in a case where a UE is out of coverage at a frequency included in the frequency list.

2. Selection with Probability

If selection criteria information indicates selection with a probability, each frequency included in a frequency list may be given a probability to be selected. A UE may select a specific frequency using a probability for each frequency included in the frequency list.

For example, a frequency list may include Frequencies #1 to #5, wherein Frequency #1 has a probability of 0.1, Frequency #2 has a probability of 0.2, Frequency #3 has a probability of 0.3, Frequency #4 has a probability of 0.4, and Frequency #5 has a probability of 0.5. The UE may select each frequency with a probability of the corresponding frequency to be selected. If frequencies available for the UE are limited to only some of frequencies included in the frequency list due to UE capability, the UE may adjust a frequency selection probability such that the sum of all probability for all the frequencies equals 1.

The method for selection with a probability may be applied even in a case where a UE is out of coverage at a frequency included in the frequency list.

3. Selection with Frequency Measurement

If selection criteria indicates selection with a frequency measurement, a UE performs measurement (e.g., RSRP or RSRQ) on a frequency included in the frequency list, and selects a frequency based on a result of measurement. When selecting based on measurement, various criterion may be considered. For example, it may be considered to select a frequency providing the best measurement. The method based on a measurement may be applied only in a case where a reference signal required for the measurement is provided from the frequencies.

4. Selection Based on Coverage

If selection criteria information indicates selection based on coverage, a UE at each frequency included in the frequency list may determine whether it is within a coverage and then change a frequency selection criteria based on the determination. For example, the UE may prioritize an in-coverage frequency over an out-of-coverage may prioritize an out-of-coverage frequency over an in-coverage frequency when it comes to selection. Whether to prioritize an in-coverage frequency or an out-of-coverage frequency may be indicated by the network to the UE or may be determined in advance. 5. Selection based on a combination of the above methods It It is possible to select a frequency based on a combination of two or more of the above methods 1 to 4. For example, it is possible to consider a combined method in which a UE randomly select a frequency from among frequencies having measurement equal to or greater than a specific threshold among frequencies included in a frequency list (that is, a combination of 1. random selection and 3. selection with a frequency measurement), or a combined method in which a frequency is selected in consideration of a probability for each frequency to be selected from among frequencies that have measurement equal to or greater than a specific threshold among all frequencies included in a frequency list (that is, a combination of 2. selection with a probability and 3. selection with a frequency measurement). The above examples are cases in which only two methods are combined, but aspects of the present invention are not limited thereto. That is, in the above combined method, an in-coverage frequency may be prioritized over an out-of-coverage frequency, or vice versa, when it comes to selection of a frequency. In this case, the above method "4. Selection based on coverage" may be added, and thus, it is possible to form a combination of three methods.

6. UE Selection

If selection criteria indicates UE selection, the UE may perform a D2D operation by selection a specific frequency, without a special criteria or limitation, from among frequencies included in a frequency list. That is, it is a method in which the UE is fully responsible for selecting a specific frequency from among frequencies included in a frequency list, and the UE may select a favorite frequency or a random frequency, without any limitation, as a frequency at which a D2D operation is to be performed.

As such, the network may explicitly direct rules of selection of a frequency to the UE. Alternatively, a specific rule of the above rules may be set in advance to be applied by the UE.

Meanwhile, after selecting a specific frequency, the UE needs to reselect a frequency as time goes by. Reselecting a frequency is a procedure of selecting one of frequencies included in a frequency list again according to a frequency selection criteria. The frequency selection criteria may be the same as an originally used criteria.

Reselection of a frequency may be performed at a specific interval. Alternatively, reselecting a frequency may be set to be performed at least once within a predetermined period of time. Each of the specific interval and the predetermined period of time may be set by the network or may be a predetermined value.

Reselection of a frequency may be performed at a time indicated by the network. The network may designate a time at which the UE needs to reselect a frequency.

Reselection of a frequency may be requested by the network. The network may request a specific UE to reselect a frequency using a UE exclusive signal or may request UEs to reselect a frequency through a broadcast signal.

The network may determine the maximum number of frequencies available for a UE. If the maximum number of frequencies is set as two or more, the UE may select frequencies less than the maximum number and perform a D2D operation according to the above method.

If the UE reselects a frequency to thereby change a frequency at which a D2D operation is performed, the UE informs the network of the reselected frequency.

Figure 16:
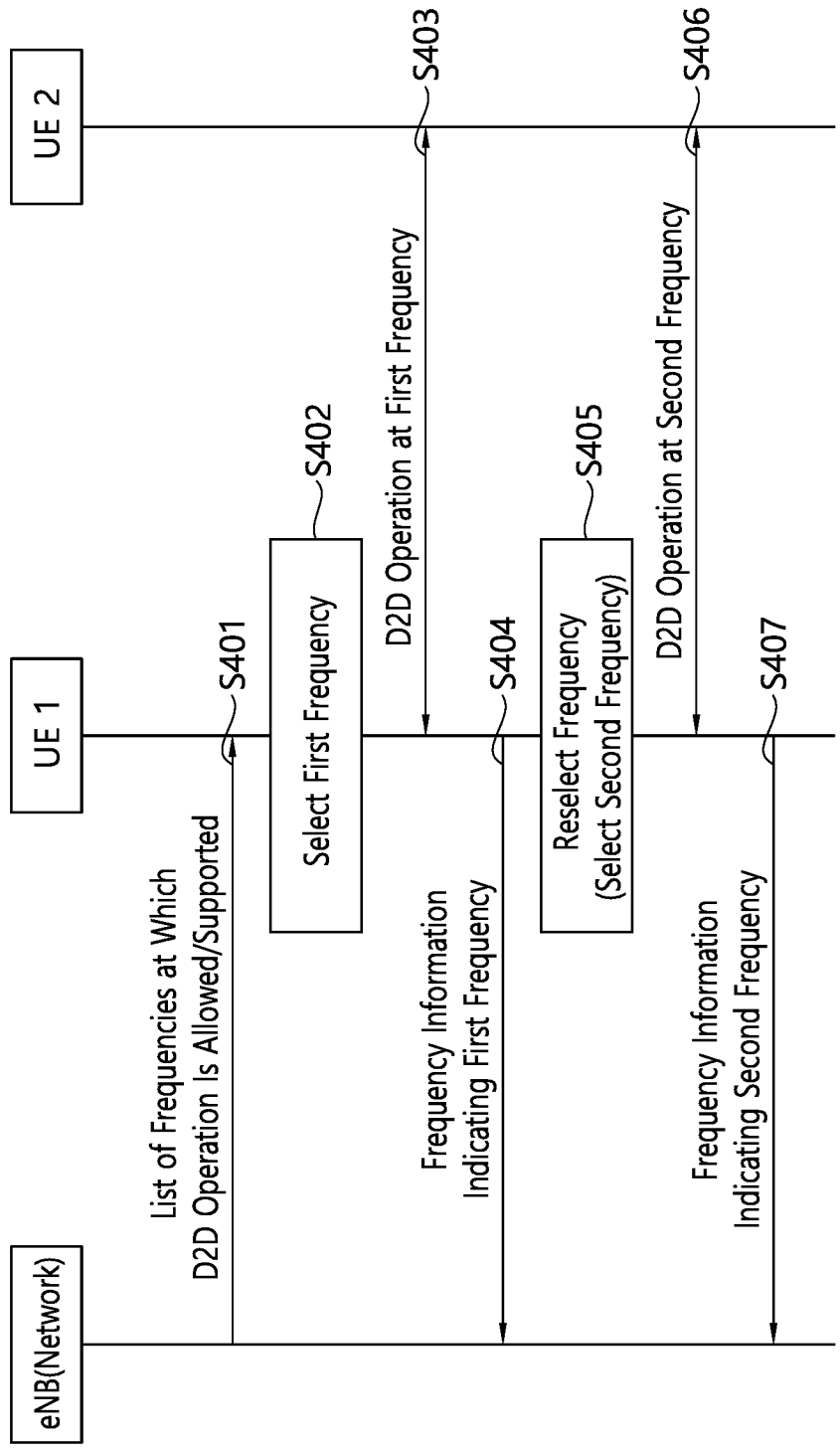
FIG. 16 shows a specific example in which the method of FIG. 15 is implemented.

FIG. 16 shows a specific example in which the method of FIG. 15 is implemented.

Referring to FIG. 16, a network provides UE 1 with a list of frequencies at which a D2D operation is allowed/supported in S401.

UE 1 selects a first frequency from the frequency list in S402, and performs a D2D operation with UE 2 at the first frequency in S403.

UE 1 feeds back, to the network, frequency information indicating the first frequency in S404.

After a predetermined period of time has elapsed, UE 1 may select a second frequency through a frequency reselection procedure in S405. Even the second frequency may be a frequency included in the frequency list.

UE 1 performs a D2D operation with UE 2 at the second frequency in S406.

UE 1 feeds back, to the network, frequency information indicating the second frequency in S407.

Meanwhile, in the above methods shown in FIGS. 15 and 16, when the network provides a frequency list, the network may provide a frequency for receiving a D2D signal and a frequency for transmitting a D2D signal, separately.

Alternatively, when providing frequencies which allow/support the D2D operation from among frequencies in the frequency list, the network may inform details of a D2D operation that is allowed/supported at each frequency. For example, if Frequency #1 to #3 is shown in the frequency list, the network may further inform that only reception of a D2D signal is possible at Frequency #1, that only transmission of a D2D signal is possible at Frequency #2, and that both reception and transmission of a D2D signal are possible at Frequency #3.

When transmitting frequency information indicating a selected specific frequency to perform a D2D operation, the UE may provide a frequency for receiving a D2D signal and a frequency for transmitting a D2D signal, separately.

Meanwhile, a UE may support carrier aggregation (CA), and support a D2D operation at a plurality of carriers. Frequencies for CA configuration with respect to the UE may overlap or different from frequencies at which the UE wishes to perform a D2D operation.

For example, suppose that Frequency #1, 2 are set in CA for a UE and that the UE supports a D2D operation at Frequency #3. In addition, suppose that the UE is capable of performing the D2D operation within a serving frequency. When the UE needs to perform the D2D operation, the UE is not able to perform the D2D operation because the serving frequency is Frequency #1, 2.

At this point, the network may change CA configuration for the UE from Frequency #1, 2 to Frequency #1, 3. Then, Frequency #3 becomes a serving frequency, and thus, the UE is able to perform the D2D operation.

The UE may use UE capability information so as to inform the network of a combination of frequencies supporting CA and frequencies supporting a D2D operation, and the network may provide appropriate CA configuration and D2D configuration to the UE based on the UE performance information.

Figure 17:
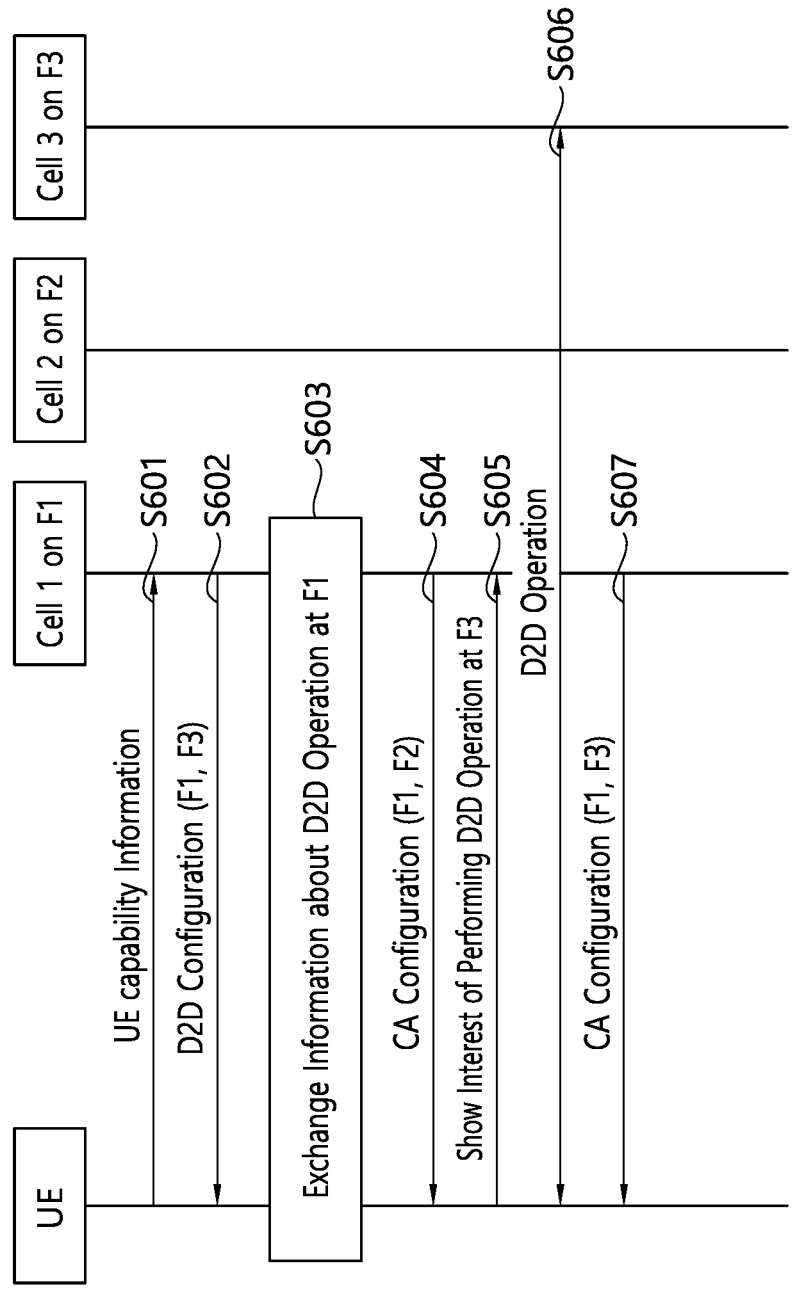
FIG. 17 is an example of a D2D operation method performed by UE which is configured carrier aggregation.

FIG. 17 is an example of a D2D operation method performed by UE which is configured carrier aggregation.

Referring to FIG. 17, a UE provides UE capability information to a network (Cell 1) in S601.

The UE capability information may include information about a combination of carrier bands supported by the UE, and D2D performance information. The information about a combination of carrier bands may be information indicating a combination of frequencies at which the UE supports CA. The D2D performance information may be information indicating frequencies at which the UE supports a D2D operation. The information about a combination of carrier bands and the D2D performance information may be combined to be called "D2D supporting band Information for each band combination." That is, the UE may provide the D2D supporting band information for each band combination to Cell 1.

For example, the UE may transmit, to Cell 1, D2D supporting band information for each band combination, the information which indicates: 1) supports a downlink (DL) at F1 and F2 while supporting an uplink (UL) and a D2D operation at F1, 2) supporting a downlink (DL) at F1 and F3 while supporting an uplink (UL) at F1 and a D2D operation at F3, 3) supports a downlink (DL) at F2 and F3 while supporting an uplink (UL) and a D2D operation at F2. In this case, the UE informs Cell 1 that the UE supports CA at F1 and F2 while supporting a D2D operation at F1, that the UE supports CA at F1 and F3 while supporting a D2D operation at F3, or that the UE supports CA at F2 and F3 while supporting a D2D operation at F2. This may be expressed as {(F1, F2)_for CA, F1_for D2D}, {(F1, F3)_for CA, F3_for D2D}, {(F2, F3)_for CA, F3_for D2D}.

Cell 1 provides D2D configuration to the UE in S602. For example, based on UE capability information (D2D supporting band information for each band combination), Cell 1 may configure D2D resources for a D2D operation at F1 and F3. F1 and F3 may be provided in the form of a frequency list.

The UE selects F1 from among F1 and F3 for a D2D operation, and exchanges information about a D2D operation at F1 with the network in S603. That is, the UE may inform the network of the selection of F1 for a D2D operation.

The network provides CA configuration to the UE in S604. Since the network is aware that the UE performs the D2D operation at F1, the network may provide corresponding CA configuration. For example, the network may provide the UE with CA configuration that indicates the use of F1 and F2 in a downlink (DL) and the use of F1 in an uplink (UL).

As time goes by, the UE may need to perform a D2D operation at F3. In this case, the UE may inform the network that the UE shows interest of performing the D2D operation at F3 in S605, and then may perform the D2D operation at F3.

The network changes CA configuration with respect to the UE in S607. According to the UE capability information, CA frequencies performed by the UE when performing a D2D operation at F3 are F1 and F3. On the other hand, CA frequencies currently set for the UE are F1 and F2. In this case, the network may change the CA frequencies to F1 and F3.

According to capability, the UE may support existing cellular communications (this indicates communications between the UE and network, which may be called WAN communications or a normal operation) and a D2D operation at the same frequency band at the same time. Alternatively, according to capability, the UE may support an existing normal operation and a D2D operation at different frequency bands at the same time. That is, according to the UE's capability, it is possible to support a normal operation and a D2D operation at the same frequency or difference frequencies at the same time.

Specifically, according to its capability, the UE may support a D2D operation only at a serving frequency (a primary or secondary frequency) or may support the D2D operation at a frequency other than the serving frequency.

In addition, supporting transmission of a D2D signal and supporting transmission of a signal according to WAN communications may be distinguished from each other. For example, even though a UE supports signal transmission (uplink transmission) according to WAN communications, this may not mean that the UE always supports transmission of a D2D signal at F1 and F2. That is, a UE supporting signal transmission at F1 and F2 according to WAN communications may support transmission of a D2D signal at F1 but may not transmit a D2D signal at F2. On the other hand, a UE supporting transmission of a D2D signal at F1 and F2 may support signal transmission only at F1 (or only at F2) according to WAN communications.

This is the case regarding reception of a D2D signal and reception of a signal according to WAN communications. For example, although a UE supports signal reception at F1 and F2 according to WAN communication, this may not mean that the UE always supports reception of a D2D signal at F2 and F2. That is, a UE supporting signal reception at F1 and F2 according to WAN communications may support reception of a D2D signal at F1 but may not support reception of a D2D signal at F2. On the other hand, a UE supporting reception of a D2D signal at F1 and F2 may support signal reception only at F1 (or only at F2) according to WAN communications.

The UE transmit information about its capability to the network through signaling, and the information is called UE capability information. However, UE capability information according to an existing standard merely indicates frequencies at which the UE supports a normal operation, that is, operation according to cellular communications, and therefore, the network is not aware of a frequency at which the UE supports a D2D operation or a frequency (or a combination of frequencies) at which the UE supports a normal operation and a D2D operation at the same time.

Hereinafter, EUTRA is taken as an example of a network in cellular communications, but it is not limited. Unless mentioned otherwise, a D2D operation includes D2D communications and D2D discovery, and transmission and reception.

The present invention suggests informing a combination of CA supporting frequencies through UE capability information and, at the same time (additionally), informing a frequency that supports a D2D operation (transmission and reception of a D2D signal).

For example, the UE may inform the network of a combination of a frequencies supporting CA and a frequency supporting transmission (Tx) of a D2D signal. For example, the UE may provide the network with UE capability information indicating {((DL_1, DL_2), UL_1), D2D_TX_2}. The meaning of the above information is that CA for the use of F1 and F2 in a downlink (DL) (that is, transmission from the network to the UE) and the use of F1 in an uplink (UL) (that is, transmission from the UE to the network) is supported, and, at the same time, transmission of a D2D signal is supported at F2.

Even in the case where the UE supports transmission of a D2D signal at a plurality of frequencies supporting, the UE may inform the network of the fact. For example, the UE may provide the network with UE capability information indicating {((DL_1, DL_2), UL_1), (D2D_TX_2, D2D_TX_3)}. The meaning of the information is that CA for the use of F1 and F2 in a downlink (DL) and the use of F1 in an uplink (UL) is supported, and, at the same time, transmission of a D2D signal is supported at F2 and F3.

Similarly, the UE may inform the network of a combination of frequencies supporting CA and a frequency supporting D2D reception. For example, the UE may provide the network with UE capability information indicating {((DL_1, DL_2), UL_1), D2D_RX_2}. The meaning of the above information is that CA for the use of F1 and F2 in a downlink (DL) and the use of F1 in an uplink (UL) is supported and reception of a D2D signal is supported at F2.

Even in the case where the UE supports reception of a D2D signal at a plurality of frequencies, the UE may inform the network of the fact. For example, the UE may provide the network with UE capability information indicating {((DL_1, DL_2), UL_1), (D2D_RX_2, D2D_RX_3)}. The meaning of the information is that CA for the use of F1 and F2 in a downlink (DL) and the use of F1 in an uplink (UL) is supported, and, at the same time, reception of a D2D signal is supported at F2 and F3.

Figure 18:
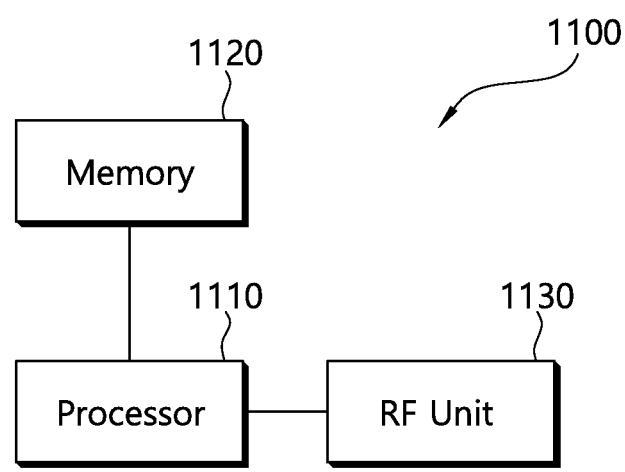
FIG. 18 is a block diagram illustrating a UE in which an embodiment of the present invention is implemented.

FIG. 18 is a block diagram illustrating a UE in which an embodiment of the present invention is implemented.

Referring to FIG. 18, a UE 1100 may include a processor 1110, a memory 1120, and a Radio Frequency (RF) unit 1130. The processor 1110 implements proposed functions, procedures, and/or methods. For example, the processor 1110 may receive, from a network, a frequency list indicating frequencies at which a D2D operation is allowed, and perform the D2D operation by selecting a specific frequency from among the frequencies included in the frequency list. Then, the processor 1110 transmits frequency information indicating the specific frequency to the network.

The RF unit 1130 is connected to the processor 1110 to transmit and receive a wireless signal.

The processor may include an application-specific integrated circuit (ASIC), other chipsets, a logical circuits, and/or a processing device. The memory include a read-only memory (ROM), a random access memory (RAM), a flash memory, a memory card, a storage medium, and/or other storage device. The RF unit may include a baseband circuit for processing a wireless signal. If the embodiments are implemented as software, the aforementioned methods may be implemented by modules (procedures, functions, etc.) for performing the aforementioned functions. The modules may be stored in the memory and may be implemented by the processor. The memory may be inside or outside the processor, and may be connected to the processor via well-known various means.

What is claimed is:

1. A method for transmitting information on a specific frequency in a wireless communication system, the method performed by a User Equipment (UE) and comprising:

receiving, from a base station (BS), a frequency list and selection information, wherein the frequency list includes a plurality of frequencies on which a vehicle-to-X (V2X) operation is supported, wherein the selection information is information indicating a selection criteria used for selecting the specific frequency on which the UE performs the V2X operation;

selecting the specific frequency based on the frequency list and the selection information;

performing the V2X operation on the specific frequency; and transmitting, to the BS, information indicating the specific frequency on which the UE performs the V2X operation, wherein the specific frequency is selected among the plurality of frequencies, wherein the selection information is information indicating whether random selection is used, whether selection based on a probability is used, whether selection based on a frequency measurement value is used, and whether selection by the UE without any limitation is used, when the UE selects the specific frequency, wherein, when the selection information indicates the random selection and the selection based on a frequency measurement value are used, the UE randomly selects the specific frequency from among frequencies having measurement equal to or greater than a specific threshold among the plurality of frequencies included in the frequency list, wherein the UE periodically performs a frequency reselection based on a specific period, wherein the specific period is indicated by the BS, wherein, when a frequency on which the UE performs the V2X operation is changed based on the frequency reselection, the UE notifies the changed frequency to the BS, wherein the UE transmits a UE capability information to the BS, wherein the UE capability information includes a frequency combination which supports a carrier aggregation and a frequency on which the V2X operation is supported.

* * * * *